(12) United States Patent
McGuire et al.

(10) Patent No.: US 7,362,341 B2
(45) Date of Patent: Apr. 22, 2008

(54) SYSTEM AND METHOD FOR CUSTOMIZING THE VISUAL LAYOUT OF SCREEN DISPLAY AREAS

(75) Inventors: Christopher J. McGuire, Monroe, WA (US); Scott R. Swanson, Redmond, WA (US); Michael J. Arnquist, Woodinville, WA (US); Donna M. Wallace, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 87 days.

(21) Appl. No.: 10/452,395

(22) Filed: Jun. 2, 2003

(65) Prior Publication Data
US 2004/0239684 A1    Dec. 2, 2004

(51) Int. Cl.
*G06F 3/048*    (2006.01)
*G06T 3/20*    (2006.01)

(52) U.S. Cl. ....................... 345/676; 715/799

(58) Field of Classification Search ............... 345/672, 345/676–682, 765, 799; 715/765, 799, 798
See application file for complete search history.

(56) References Cited

U.S. PATENT DOCUMENTS 5,712,995 A * 1/1998 Cohn ........................ 715/792
5,819,055 A * 10/1998 MacLean et al. ........... 715/798
5,917,483 A * 6/1999 Duncan et al. ............. 715/802
5,977,973 A * 11/1999 Sobeski et al. ............. 715/798
6,771,292 B2 * 8/2004 Sharp ........................ 715/788

OTHER PUBLICATIONS

Luders, P. et al., "The Dynamic Screen-Beyond the Limits of Traditional Graphic User Interfaces", *Proceedings of the IFIP 13th World Computer Congress*, Sep. 1994, 1, 109-114.
Miah, T. et al., "Visual Recognition of Windows: Effects of Size Variation and Presentation Styles", *Proceedings of the Australasian Computer Human Interaction Conference*, 1998, 72-79.
Nakamura, T. et al., "A Multiple-Window Display",*Systems and Computers in Japan*, 1990, 21(7), 1-11.
IBM Research/ Eclipse, http://www.research.ibm.com/eclipse, Home Page, 2 pages.
JetBrains IntelliJ IDEA—the best Java IDE around, http://www.intellij.com, Copyright © 2000-2003, JetBrains, Inc, 1 page.

* cited by examiner

*Primary Examiner*—Jeffery A. Brier
(74) *Attorney, Agent, or Firm*—Woodcock Washburn LLP

(57) ABSTRACT

A target acquisition model is used to position the screen display areas. An area is docked by acquiring the screen display area to be docked and dragging a representation of the screen display area towards the desired location. As the mouse pointer enters the boundaries of the target area, a target group appears within the area. A target group represents the five behaviors that can be triggered: dock to left, dock to top, dock to right, dock to bottom and dock together or tab dock. Touching the desired docking target with the mouse acquires the target.

11 Claims, 9 Drawing Sheets

SYSTEM AND METHOD FOR CUSTOMIZING THE VISUAL LAYOUT OF SCREEN DISPLAY AREAS

FIELD OF THE INVENTION

The invention relates to user interfaces and in particular to customizing the visual layout of screen display areas.

BACKGROUND OF THE INVENTION

When using a computer, it is frequently helpful to have multiple screen display areas appear on a monitor's surface at the same time. Frequently it is helpful for the user to be able to position the screen display areas in a particular fashion so that the task the user is trying to accomplish is easier. In particular, in a development environment, it is helpful to be able to dock or attach particular screen display areas to particular user-specified locations.

Previous methods of customizing the visual layout of screen display areas have often been clumsy and counter-intuitive. For example, one existing way to customize the visual layout of screen display areas is based on the position of the mouse pointer with respect to invisible hot zones when the mouse button is released. Thus, for example, a first screen display area may be anchored in one position when the mouse button is released at one screen location and a second screen display area may be anchored in a much different position when the mouse button is released at a second screen location only one pixel away from the first screen location because a different "hot zone" was activated. This behavior tends to confuse and confound users. Although it might be helpful to make the "hot zones" visible, as for example, by placing icons (such as bulls eyes, for example) representing the hot zones on thescreen, and to decrease the number of hot zones, the feature is likely to still be difficult for users to understand and use.

It would be helpful if a more intuitive and reproducible screen display area placement feature were available.

SUMMARY OF THE INVENTION

A target acquisition model is used to position screen display areas. An area may be docked by acquiring the screen display area to be docked and dragging a representation of the screen display area towards the desired location. As the mouse pointer enters the boundaries of the target area, a target group may appear within the area. A target group may represent the five behaviors that can be triggered: dock to left, dock to top, dock to right, dock to bottom and dock together or tab dock. Touching the desired docking target with the mouse acquires the target. Initially, all targets may be visible, but as the representation of the screen display area to be docked enters a desired docking screen display area, some docking targets may fade and disappear.

BRIEF DESCRIPTION OF THE DRAWINGS

The foregoing summary, as well as the following detailed description of illustrative embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Overview

Figure 1:
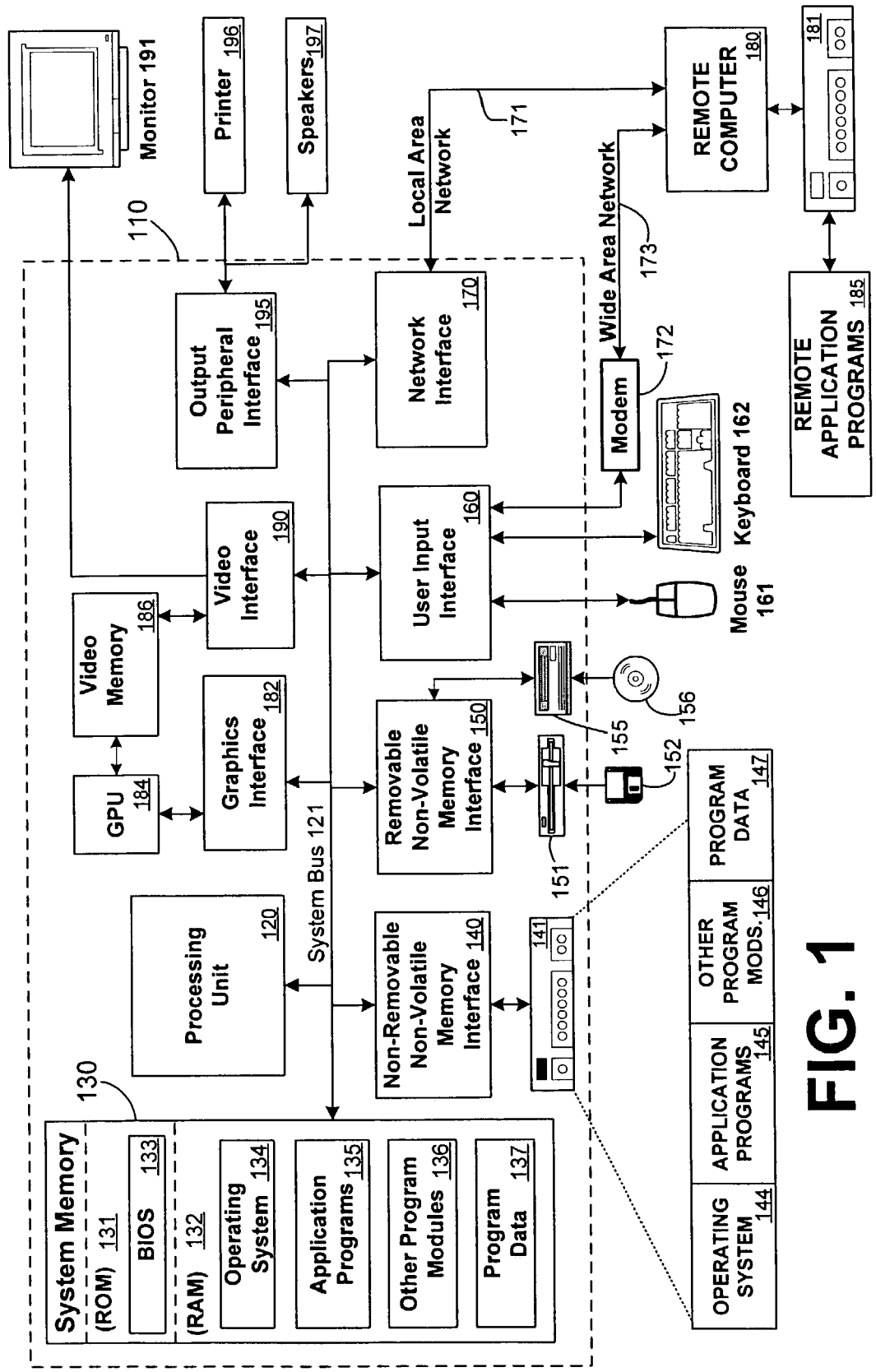
FIG. 1 is a block diagram showing an exemplary computing environment in which aspects of the invention may be implemented.

In one embodiment of the invention, an interface to a software development environment hosts a number of screen display areas that provide information and functionality to the user. These screen display areas can be positioned or arranged in a number of different ways within the application display. A screen display area can, for example, be "floating" which means that the screen display area is not anchored to another screen display area. A screen display area can be "docked" or anchored to another screen display area or anchored within the boundaries of the application display. A screen display area can be "tab docked" which means that the screen display area occupies the same space (e.g., as by overlaying) as one or more other screen display areas and is accessible by means of a row of tabs that can be selected, to determine which of the screen display areas is visible. A screen display area may also be "auto hidden" which means that when inactive, the screen display area appears as a tab at one edge of the application display. Upon activation, by selection of the tab, the auto hidden area slides into view and may automatically retract when no longer needed, (e.g., as for example, when another screen display area acquires focus.)

In one embodiment of the invention, a target acquisition model is used to position the screen display areas. An area is docked by acquiring the screen display area to be docked and dragging a representation of the screen display area towards the desired location. As the cursor or pointer enters the boundaries of the target area, a target group appears within the area. A target group may represent the five behaviors that can be triggered: dock to left, dock to top, dock to right, dock to bottom and dock together or tab dock, or some subset thereof. Touching the desired docking target with the cursor or pointer acquires the target. Each area within the application area where docking is enabled has a corresponding target group. The target group corresponding to a docking-enabled area appears when the cursor or pointer enters the boundary of the docking-enabled area. When the cursor or pointer or other enters the boundary of a docking target, the target is selected and its appearance changes to indicate its selection. Releasing the cursor or pointer manipulator acquires the target and completes the docking process. Moving the cursor or pointer out of the boundaries of an area without releasing the cursor or pointer manipulator results in the disappearance of the target group associated with the area.

Usability studies conducted comparing the known model of customizing screen display layout based on the position of the mouse pointer with respect to invisible hot zones to the present target-based model shows an approximate 26% improvement in speed to complete assigned tasks such as docking or attaching a screen display area to an area that occupies a position adjacent to a second screen display area (a simple dock), attaching a screen display to an area that occupies one side of a lower portion of an application area (a width dock), a tab dock (described above) or attaching a screen display area to an area that occupies a lengthwise portion of a screen display area (a length dock). With practice, the usability study showed that users maintained an approximate 25% improvement over using the known mouse pointer position model. Performance differences were most dramatic with width docking which showed an approximate 40% improvement in speed with the target-based mode. With practice the target-based model showed an approximate 50% improvement. With the mouse pointer position model, users continued to have difficulty with width docking even after three sessions. Questionnaires distributed to users showed that users strongly preferred the target based model. Ten users were asked to answer the following questions, comparing the target-based model to the mouse pointer position model. The number below the headings indicates affirmative answers. For example, in the first question, "which is easier to use?, ten users answered that the target based model was easier to learn, zero users answered that the pointer-based model was easier to use.

|  | Target-based | Pointer-based | Same |
|---|---|---|---|
| Which is easier to use? | 10 | 0 | 0 |
| Which is easier to learn? | 10 | 0 | 0 |
| Which is simpler to use? | 9 | 1 | 0 |
| Which is more effective to complete work? | 7 | 0 | 3 |
| Which allows to work more quickly? | 10 | 0 | 0 |
| Which more efficiently complete work? | 7 | 0 | 3 |
| Become productive more quickly? | 10 | 0 | 0 |
| More comfortable using? | 9 | 0 | 1 |
| Like using? | 9 | 0 | 1 |
| Works more predictably? | 10 | 0 | 0 |
| Overall more satisfied with? | 10 | 0 | 0 |

Exemplary Computing Environment

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations.

Other well known computing systems, environments, and/or configurations that may be suitable for use with the invention include, but are not limited to, personal computers (PCs) automated teller machines, server computers, handheld or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1a illustrates operating system 134, application programs 135, other program modules 136, and program data 137.

The computer 110 may also include other removable/non-removable, volatile/nonvolatile computer storage media. By way of example only, FIG. 1a illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1e. The logical connections depicted in FIG. include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1a illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

System and Method for Customizing the Layout of Screen Display Areas

Figure 2:
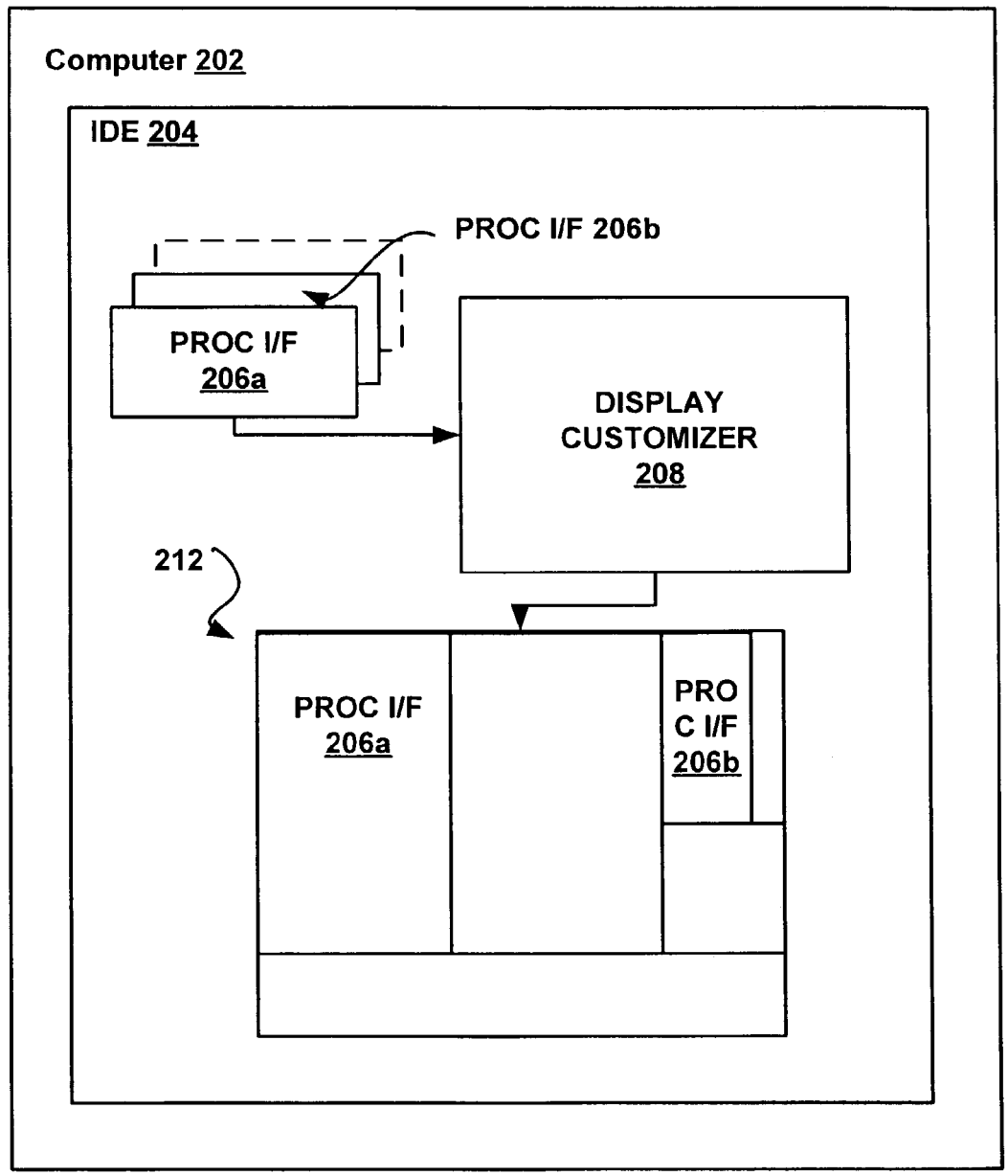
FIG. 2 is a block diagram of an exemplary design environment in which aspects of the invention may be implemented.

FIG. 2 illustrates an exemplary system for customizing the layout of screen display areas in accordance with one embodiment of the invention. Referring now to FIG. 2, computer 202 represents a computer such as but not limited to a user or development computer on which the invention may reside. The invention may be implemented as a component of an integrated design environment or as a standalone system for use with multiple processes. The invention may include a display screen area layout customizer component 208, and one or more of the following: one or more language services, one or more editors for drafting and editing source code and one or more compilers (not shown). Those of ordinary skill in the art will appreciate that the design environment IDE 204 may also include other components. Display screen area layout customizer 208 repositions process interfaces 206a, 206b, etc. in response to user input as described more fully below, to generate display 212.

Figure 3A:
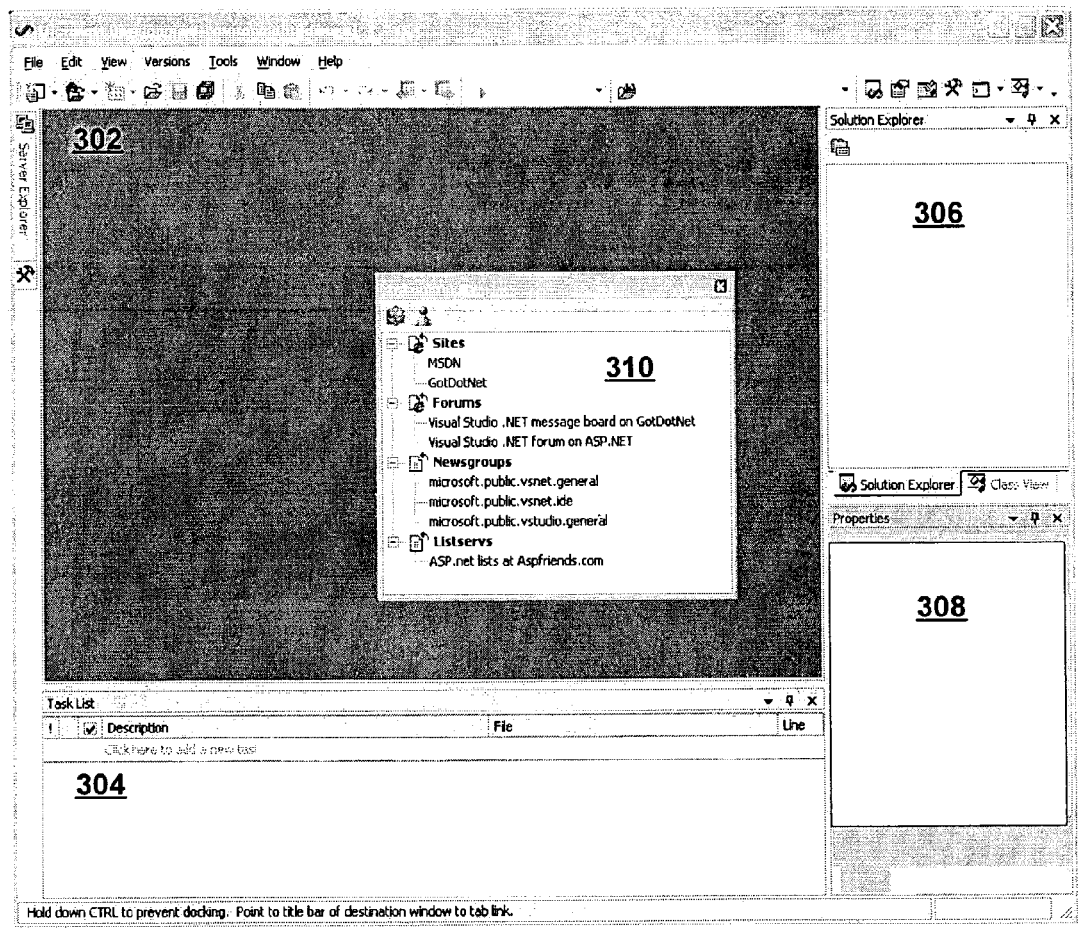
FIGS. 3a-3f are screen shots of exemplary screen displays in accordance with aspects of an embodiment of the invention.
Figure 3B:
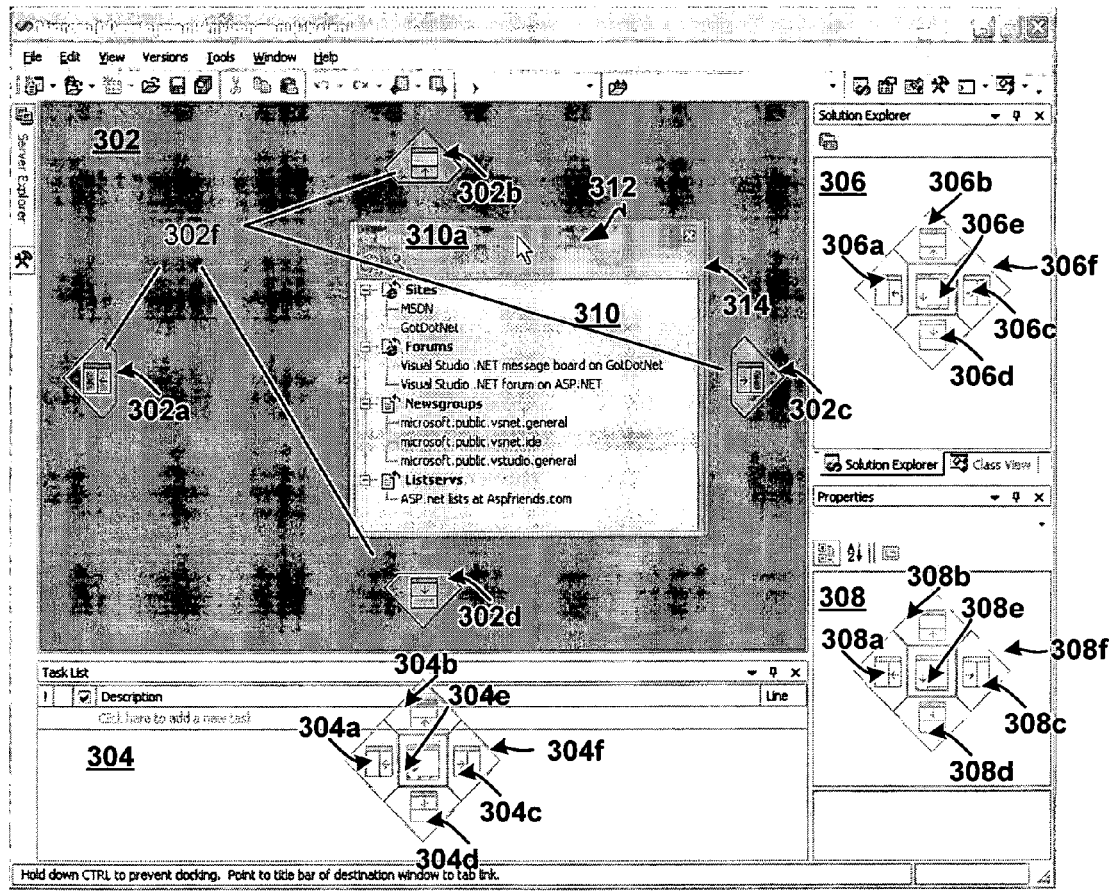
Figure 3C:
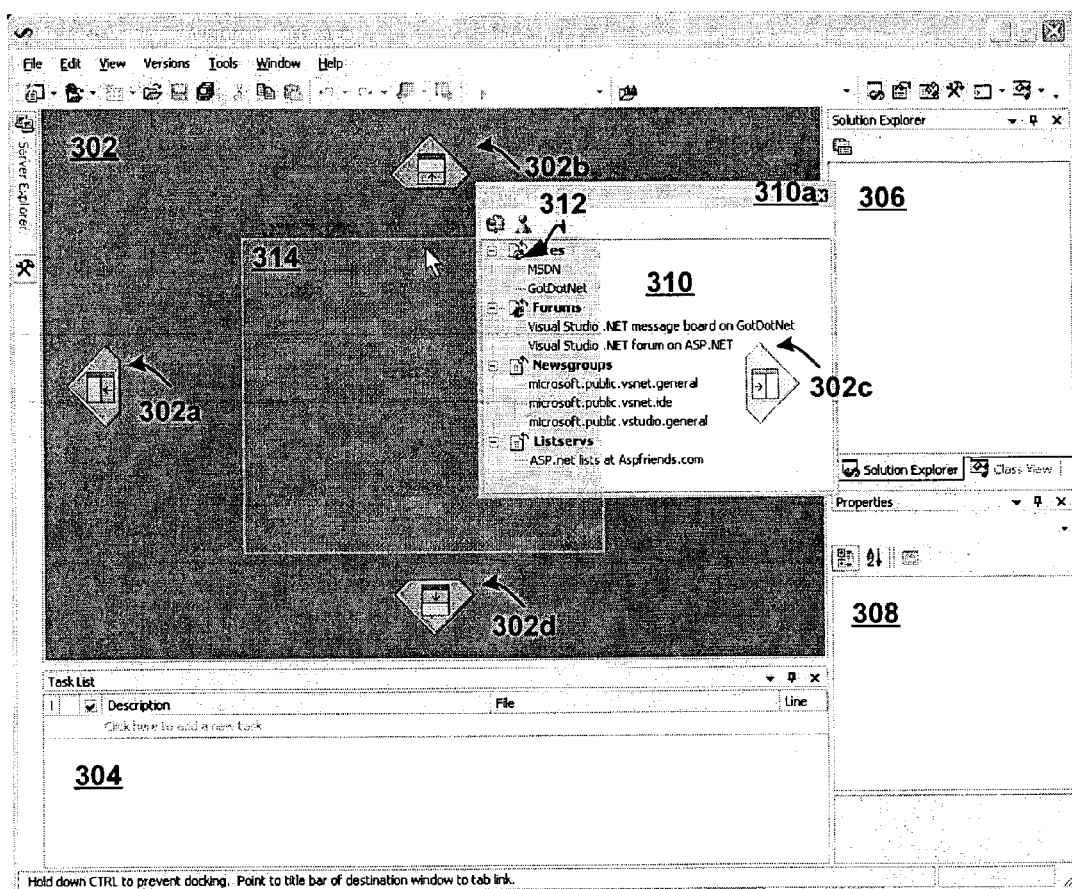
Figure 3D:
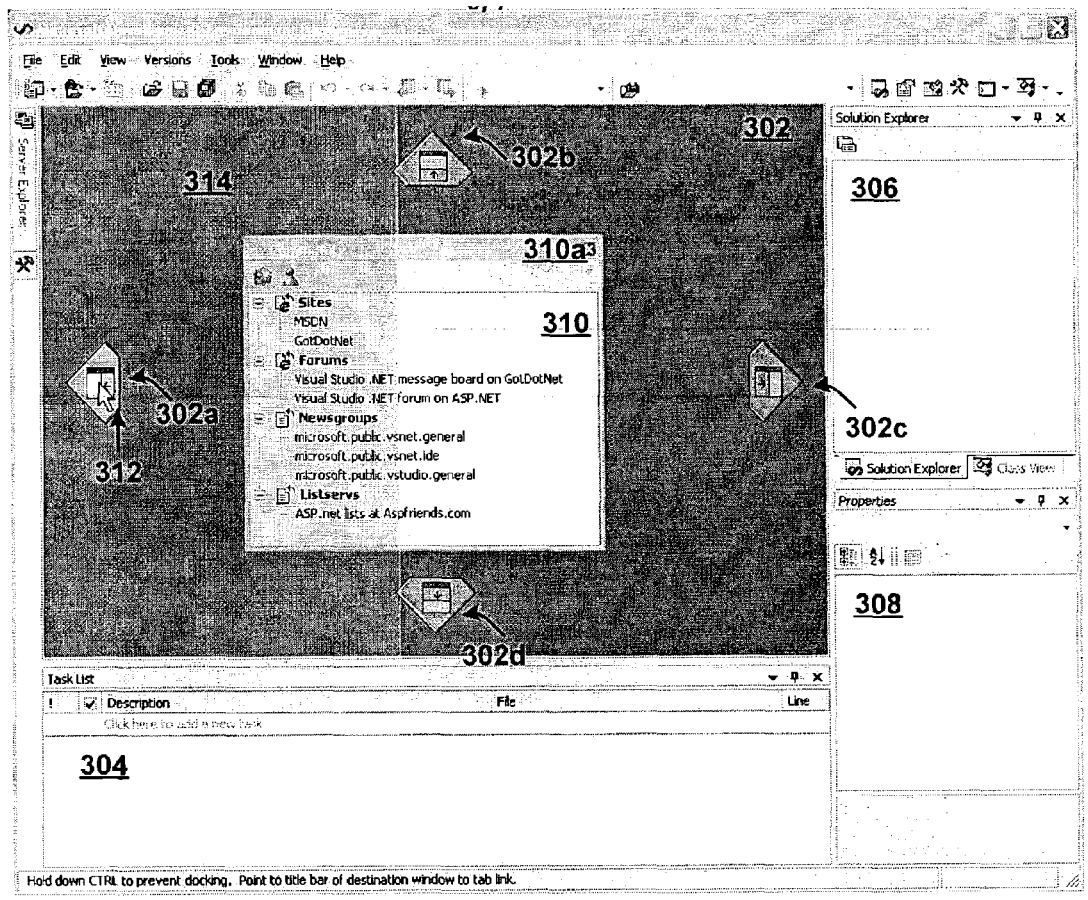
Figure 3E:
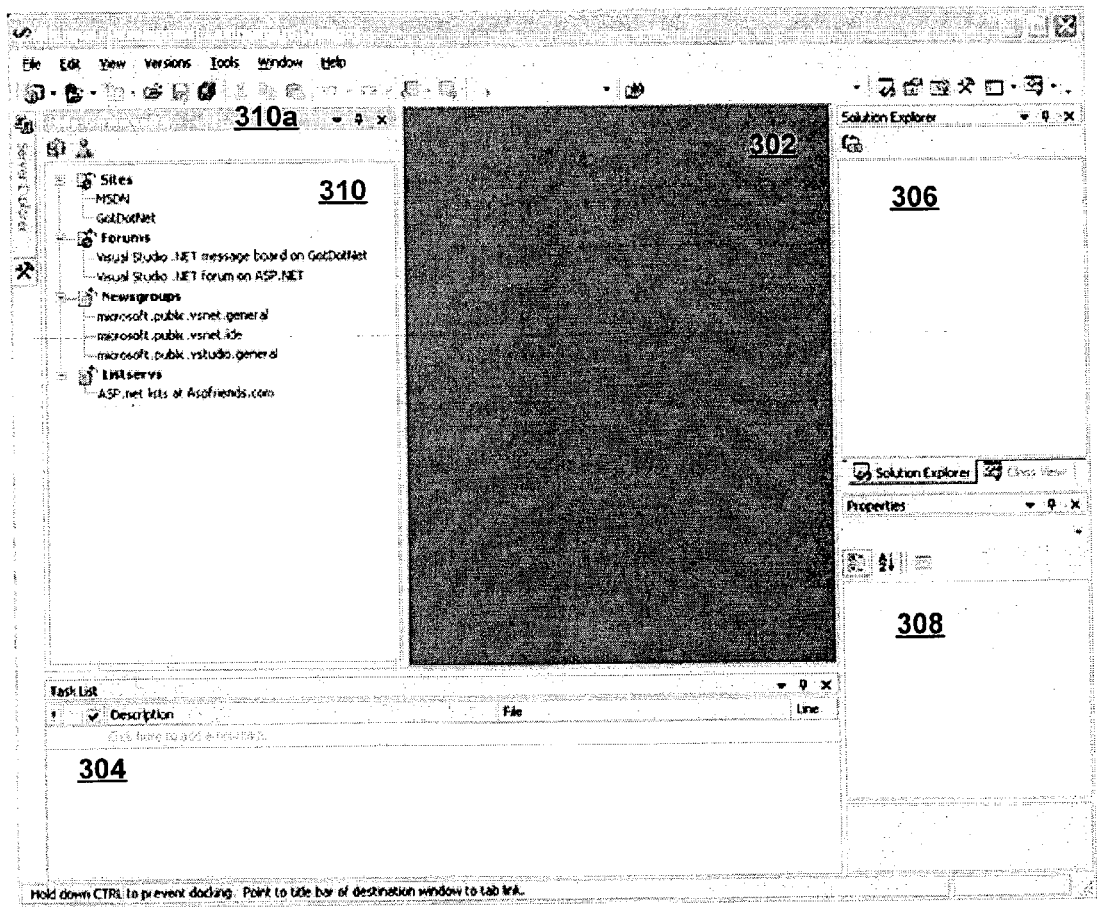
Figure 3F:
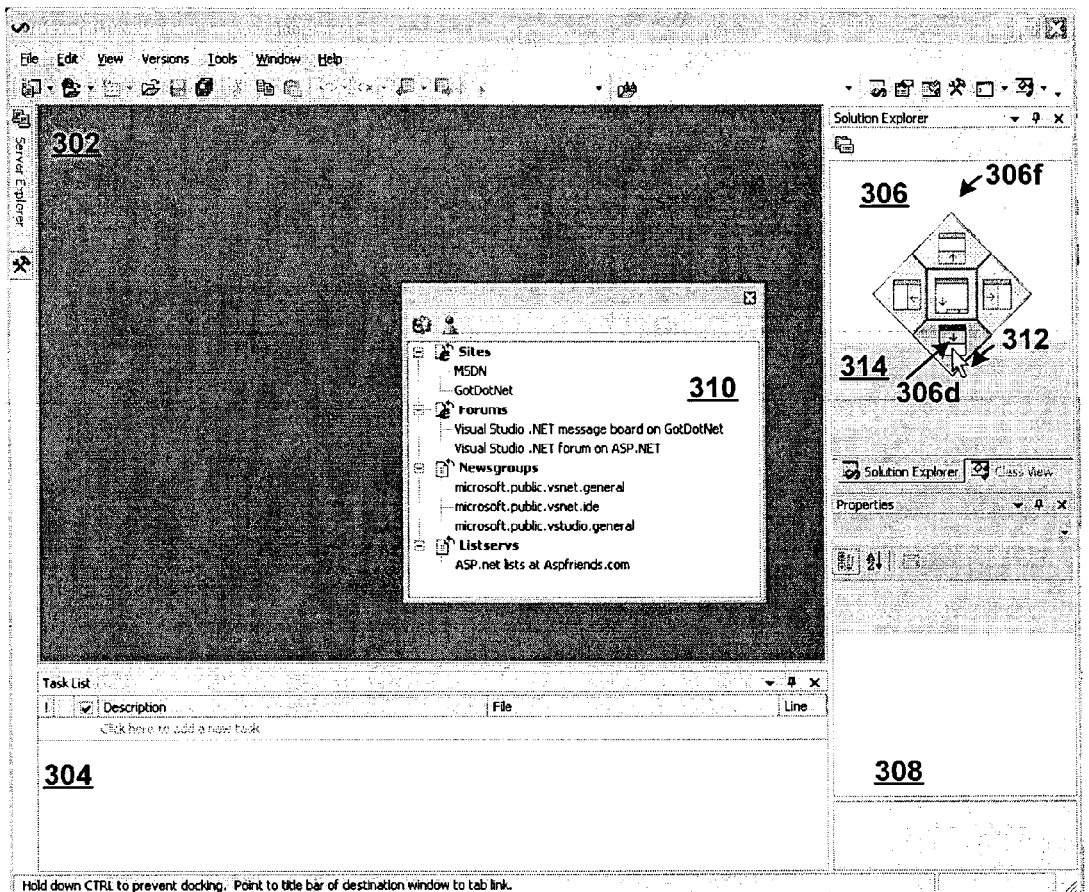
Figure 4:
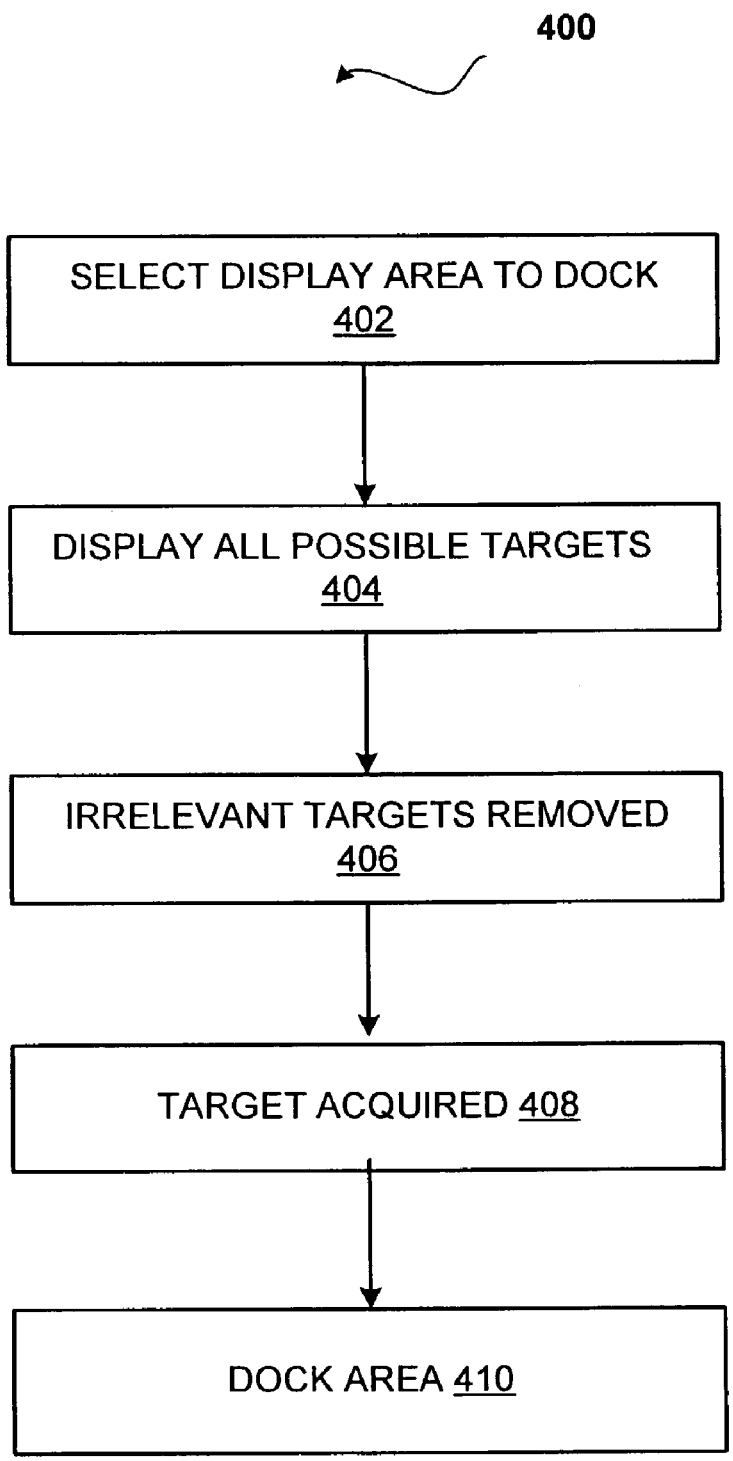
FIG. 4 is a flow diagram of a method of customizing screen display area layout in accordance with one embodiment of the invention.

FIGS. 3a to 3f illustrate exemplary screen shots as may be displayed in the practice of the invention. FIG. 4 is a flow diagram of a process of customizing screen display area layout in accordance with one embodiment of the invention. Referring concurrently now to the screen shots of FIGS. 3a to 3f and to FIG. 4, FIG. 3a illustrates an exemplary user interface 300 comprising four screen display area areas, 302, 304, 306 and 308. It will be understood that although exemplary user interface 300 illustrates four screen display areas, the invention as contemplated is not so limited. Any suitable number of screen display areas, providing the ability to attach in any of the ways described above, is contemplated.

Screen display area 302 may represent a user interface for a process. Screen display areas 304, 306 and 308 may similarly represent the user interfaces for three other processes. Screen display area 310 may represent a floating screen display area, meaning that screen display area 310 is not presently anchored with screen display areas 302, 304, 306 or 308 within application display 300. It will be noted that although floating screen display area 310 overlays screen display area 302, a screen display area for docking may appear anywhere on application display 300 and may overlay one or more screen display areas, completely or partially.

At step 402 a screen display area is selected for docking. Referring to FIG. 3b), suppose screen display area 310 is selected for docking. Screen display area 310 may be selected for docking by, for example, left-clicking on the title bar 310a of screen display area 310 but not releasing the mouse button. Alternatively, screen display area 310 may be selected for docking by right-clicking anywhere on the screen display area 310 or by any other pre-determined means. In FIG. 3b, selecting screen display area 310 for docking is indicated by the appearance of the cursor 312 on the title bar 310 a of screen display area 310. When the cursor 312 is moved across screen area 302 via the mouse or other cursor manipulator, (often called a drag operation), in one embodiment of the invention, a frame or screen shadow 314 of screen display area 310 appears and a target group associated with each docking-enabled screen display area is displayed. The frame or screen shadow area 310 approximates the appearance of the screen display area 310, when docked or attached. In one embodiment of the invention, screen shadow 314 is semi-transparent or alpha-blended.

In the exemplary screen shot of FIG. 3b, screen display areas 302, 304, 306 and 308 are all docking-enabled screen display areas so that target groups (e.g., target group 304f in screen display area 304, target group 306f in screen display area 306 and target group 308f in screen display area 308 ) appear in all four screen display areas, however, one of skill in the art will understand that not all the screen display areas in an application display may be so enabled, and thus a target group associated with that screen display area may not appear. For example, if screen display area 304 were not docking-enabled, target group 304f would not appear.

In one embodiment of the invention a threshold movement of cursor 312 (e.g., a movement of 2 pixels) must be attained before the cursor movement is recognized as a request for docking so that random mouse movements do not trigger a docking operation when none is desired.

At step 404, in response to the received request for docking, all possible targets appear. In FIG. 3b, target group 304f includes dock-to-left target 304a, dock-to-top target 304b, dock-to-right target 304c, dock-to-bottom target 304d and tab dock target 304e associated with screen display area 304. Target group 306f includes dock-to-left target 306a, dock-to-top target 306b, dock-to-right target 306c, dock-to-bottom target 306d and tab dock target 306e associated with screen display area 306. Target group 308f includes dock-to-left target 308a, dock-to-top target 308b, dock-to-right target 308c, dock-to-bottom target 308d and tab dock target 308e associated with screen display area 308. Target group 302f includes dock-to-left target 302a, dock-to-top target 302b, dock-to-right target 302c, and dock-to-bottom target 302d associated with screen display area 302.

At step 406, all irrelevant target groups disappear as a result of the movement of a representation of the window to be docked. Suppose now that screen display area 310 is to be docked on the left hand side of screen display area 302. Referring now to FIG. 3c, in one embodiment of the invention, as representation of screen display area 310, screen shadow 314, is dragged across screen display area 302 to the left, group targets 304f, 306f and 308f disappear, because screen display area 302 has been selected as the area in which screen display area 310 will be docked. Similarly, had screen display area 306 been selected by dragging shadow screen 314 into screen display area 306, target groups 302f, 304f and 308f would disappear, as illustrated in FIG. 3f, and so on.

At step 408, a target is acquired. Referring now to FIG. 3d, target 302a is acquired by moving cursor 312 onto target 302a, thus positioning shadow screen 314 on the left hand side of screen display area 302.

At step 410 the screen display area 310 is docked to the left side of screen display area 302. In one embodiment of the invention, docking is effected by releasing the left hand mouse button, although other pre-determined actions may alternately or additionally dock the screen display area. FIG. 3e illustrates an exemplary screen display area 310, as it appears when docked as described above.

In one embodiment of the invention, instead of the target groups as shown in FIGS. 3a-3f, the targets appear as multi-colored blocks with a light or bright colored block indicating the position of the docking target.

In one embodiment of the invention, when a screen display area is selected, right clicking will open a list of docking options including options such as "Hide, Dockable, Dock With" and so on. Selecting "Dock With" in one embodiment will open another list listing all the other available display areas for docking. Selecting a display area for docking may further open another list including the docking options: dock left, dock to top, dock right, dock to bottom and tab dock.

In one embodiment of the invention, the above described feature can co-exist with a previous method of layout customization, enabling the user to use the method with which the user is more familiar. In one embodiment of the invention, the feature can be turned on or off by means of setting a profile switch or an option in a menu.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

While the present invention has been described in connection with the preferred embodiments of the various figures, it is to be understood that other similar embodiments may be used or modifications and additions may be made to the described embodiments for performing the same function of the present invention without deviating therefrom. For example, floating screen display areas may be docked together and float above and/or outside the main application window. In a system configuration that includes multiple windows, the docked screen area display may be on a different monitor from the main application window. Therefore, the present invention should not be limited to any single embodiment, but rather should be construed in breadth and scope in accordance with the appended claims.

What is claimed is:

1. A method for customizing screen display area layouts comprising:
    selecting a screen display area to be positioned within an application display area, the application display area comprising a first application display area and a second application display area, the first application display area associated with a first target group and the second application display area associated with a second target group, each target group comprising a plurality of targets, each of the plurality of targets associated with anchoring the screen display area to a different region of the application display area, wherein, in response to selecting the screen display area, the first target group and the second target group are displayed on a display, the first application display area having a plurality of targets comprising a first target associated with a first region of the first application display area and a second target associated with a second region of the first application display area;
    selecting the first application display area in response to an operation dragging the screen display area towards the first target, wherein the second target group is removed from the display while continuing to display the first target group; and
    anchoring the screen display area in the first region of the first application display area by moving a cursor onto the first target, whereby anchoring the screen display area customizes the display for visual displaying to a user and removes the first target group from the display; and
    displaying the customized display to the user.

2. The method of claim 1, wherein in response to moving the cursor onto the first target, the screen display area is displayed in the region associated with the selected first target.

3. The method of claim 1, wherein the first target group comprises the first target associated with a top region of the first application display area.

4. The method of claim 3, wherein the first target group comprises the second target associated with a bottom region of the first application display area.

5. The method of claim 4, wherein the first target group comprises a third target associated with a left region of the first application display area.

6. The method of claim 5, wherein the first target group comprises a fourth target associated with a right region of the first application display area.

7. The method of claim 6, wherein the first target group comprises a fifth target associated with a tab region of the first application display area, wherein the screen display area is visible in the first application display area when a tab associated with the screen display area is selected.

8. The method of claim 1, wherein the step of selecting a screen display area to be positioned within an application display area comprises positioning a cursor on a portion of the screen display area and depressing and holding down a portion of a cursor control mechanism.

9. The method of claim 8, wherein, in response to the step of selecting a screen display area to be positioned within an application display area, a representation of the screen display area is displayed.

10. The method of claim 9, wherein the representation is a semi-transparent box of the approximate size of the screen display area.

11. A system for customizing an application display comprising an application screen display customizer that receives at least one of a plurality of process interfaces, the at least one process interface associated with a first area of an application display, the customizer also receiving a screen display area and wherein the customizer positions the screen display area within the first area of the application display in response to moving a visible representation of the screen display area into the first area, the first area having a target group, the target group comprising a plurality of targets, comprising a first target of the plurality of targets, the first target associated with a first region of the first area, and a second target of the plurality of targets, the second target associated with a second region of the first area, each of the plurality of targets associated with anchoring the screen display area to a different region of the first area of the application display associated with the target group, wherein the target group associated with the first area is a first target group, the system further comprising a second process interface associated with a second area of the application display and a second target group, the first and second target groups being visible on the application display upon selection of the screen display area,
    wherein in response to selection of the first area by moving the visible representation of the screen display area into the first area, the second target group disappears from the application display, and wherein a user customizes a display for visual displaying by positioning the screen display area to the first region within the first area of the application display, and wherein the positioning of the screen display area to the first region anchors the screen display area to the first region of the first area, causing the first target group to disappear from the application display, and
    wherein a monitor displays the customized display to the user.

* * * * *

UNITED STATES PATENT AND TRADEMARK OFFICE
CERTIFICATE OF CORRECTION

| | | |
|---|---|---|
| PATENT NO. | : 7,362,341 B2 | Page 1 of 1 |
| APPLICATION NO. | : 10/452395 | |
| DATED | : April 22, 2008 | |
| INVENTOR(S) | : Christopher J. McGuire et al. | |

It is certified that error appears in the above-identified patent and that said Letters Patent is hereby corrected as shown below:

In column 6, line 20, delete "FIG. 1e." and insert -- FIG. 1. --, therefor.

In column 6, line 21, delete "FIG." and insert -- FIG. 1 --, therefor.

In column 6, line 37, delete "FIG. 1a" and insert -- FIG. 1 --, therefor.

In column 7, line 33, delete "FIG. 3b)," and insert -- FIG. 3b, --, therefor.

In column 7, line 56, delete "308 )" and insert -- 308) --, therefor.

Signed and Sealed this
Fifteenth Day of February, 2011

David J. Kappos
*Director of the United States Patent and Trademark Office*